US010077104B2

(12) United States Patent
Ataman

(10) Patent No.: US 10,077,104 B2
(45) Date of Patent: Sep. 18, 2018

(54) PROXIMITY SENSOR FOR AIRCRAFT AND HAVING A HYDRAULIC FUSE

(71) Applicant: MESSIER-BUGATTI-DOWTY, Velizy Villacoublay (FR)

(72) Inventor: Gary Ataman, Whitby (CA)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 258 days.

(21) Appl. No.: 15/012,340

(22) Filed: Feb. 1, 2016

(65) Prior Publication Data

US 2016/0221666 A1 Aug. 4, 2016

(30) Foreign Application Priority Data

Feb. 2, 2015 (FR) ...................... 15 50800

(51) Int. Cl.
| F15B 15/28 | (2006.01) |
| B64C 25/22 | (2006.01) |
| B64C 25/28 | (2006.01) |
| G01L 13/00 | (2006.01) |
| F15B 20/00 | (2006.01) |

(52) U.S. Cl.
CPC ............. B64C 25/22 (2013.01); B64C 25/28 (2013.01); F15B 15/2807 (2013.01); F15B 15/2838 (2013.01); G01L 13/00 (2013.01); F15B 20/007 (2013.01)

(58) Field of Classification Search
CPC .. F15B 15/2807; F15B 15/2835; F15B 15/28; F15B 15/2892; G01L 13/00; B64C 25/28
See application file for complete search history.

(56) References Cited

U.S. PATENT DOCUMENTS 3,414,693 A * 12/1968 Watson et al. .......... F01B 17/00
200/302.2
4,679,452 A 7/1987 Stoll

FOREIGN PATENT DOCUMENTS

| CA | 2 576 801 A1 | 3/2006 |
| FR | 2 121 951 A5 | 8/1972 |
| GB | 2 122 726 A | 1/1984 |
| JP | 1-143404 U | 10/1989 |
| JP | 5-58910 U | 8/1993 |

OTHER PUBLICATIONS

French Preliminary Search Report for FR 15 50800 dated Dec. 10, 2015.

\* cited by examiner

Primary Examiner — F. Daniel Lopez
Assistant Examiner — Abiy Teka
(74) Attorney, Agent, or Firm — Sughrue Mion, PLLC

(57) ABSTRACT

A sensor (1) having a housing (2) defining an internal volume (3), a movable part (4), a detector (5) for detecting movement of the movable part (4), a transfer mechanism (6) passing through a first opening (7) of the housing (2) to control movement of the movable part (4) from a first external zone (8), and a first sealing structure (9) for opposing the passage of fluid coming from the first external zone (8) towards said internal volume (3). The housing (2) includes a second opening (10) extending between the internal volume (3) and a second external zone (11); and a second sealing structure (12) between the internal volume (3) and the second external zone (11), the second sealing structure being adapted to break so as to allow fluid to pass as soon as a first predetermined pressure difference is exceeded.

11 Claims, 1 Drawing Sheet

_US 10,077,104 B2_

PROXIMITY SENSOR FOR AIRCRAFT AND HAVING A HYDRAULIC FUSE

CROSS REFERENCE TO RELATED APPLICATIONS

This application claims priority based on French Patent Application No. 15 50800 filed Feb. 2, 2015, the contents of all of which are incorporated herein by reference in their entirety.

The invention relates to a sensor, and in particular to a system comprising an actuator and a sensor and serving to detect a position of the piston of an actuator.

BACKGROUND OF THE INVENTION

More particularly, the invention relates to a sensor comprising:
- a housing defining an internal volume that is internal to the housing;
- a movable part situated inside said internal volume of the housing;
- detector means for detecting a movement of said movable part relative to the housing;
- transfer means passing through a first opening in the housing and arranged to act from a first external zone external to the housing to cause said movable part situated inside said internal volume to move; and
- first sealing means arranged relative to the housing and to the transfer means to oppose fluid passing from the first external zone external to the housing towards said internal volume of the housing via said first opening of the housing.

Such a sensor may be subject to malfunction when its internal volume is subjected to large variations of pressure, in particular as a result of leakage through the first sealing means of the sensor.

OBJECT OF THE INVENTION

An object of the invention is to obtain a sensor capable of limiting the risk of malfunction as a result of sealing being broken in the first sealing means.

SUMMARY OF THE INVENTION

In order to achieve this object, the invention essentially proposes a sensor of the above-defined type that is essentially characterized in that:
- the housing further includes a second opening extending between said internal volume of the housing and a second external zone external to the housing; and
- second sealing means arranged to oppose fluid passing via said second opening between the internal volume and the second external zone that are respectively internal and external to the housing, at least some of the second sealing means being adapted to break to allow fluid to pass as soon as the internal pressure in the internal volume exceeds the external pressure in the second external zone by a first predetermined pressure difference.

Thus, in the event of sealing being broken in the first sealing means, the pressure inside the internal volume of the housing begins to vary as a function of the pressure that exists in the first external zone external to the housing. If the pressure differential between the internal volume and the second external zone exceeds the first predefined pressure difference, then at least some of the second sealing means break so as to allow fluid to pass from the internal volume to the second external zone. This allows the pressure difference that exists between the internal volume and the second external zone to be reduced so as to reduce any risk of damaging the housing and in particular the means for detecting movement of said movable part relative to the housing.

The second sealing means act as a hydraulic fuse using a permanent mechanical break of at least some of the second sealing means to limit pressure differences between the inside and the outside of the internal volume internal to the housing.

It should be observed that the first pressure difference has a value lying in the range 150 kilopascals (kPa) to 25000 kPa, preferably 150 kPa to 3000 kPa and preferably in the range 150 kPa to 500 kPa, this value being the pressure difference between the pressure that exists in the internal volume minus the pressure that exists in the second external zone external to the housing.

In a particular embodiment of the sensor of the invention, the detector means include electronic components that are situated in a protected space of the housing that is spaced apart from said internal volume, the sensor further including third sealing means arranged to oppose fluid passing between the internal volume and the protected space, the second sealing means and the third sealing means being arranged so that in the event of the pressure inside the internal volume increasing, the second sealing means always break before the sealing of the first sealing means is broken.

In other words, in the event of the pressure inside the internal volume increasing, the second sealing means always break so as to allow the pressure in the internal volume to be decreased, thereby preserving the integrity of the third sealing means that protect the electronic components placed in the protected space. The electronic components may comprise a transistor and/or an amplifier and/or an inductor, which might be damaged in the event of being immersed in hydraulic fluid.

In a particular embodiment of the invention, the second sealing means include a plug assembled in the second opening of the internal volume, the plug having one face facing towards the internal volume and another face facing towards the second external zone, and a bore extending between these two faces of the plug, the bore being filled with a sealing material arranged so as to be expelled from the bore when it is subjected to a pressure difference at least equal to said first predetermined pressure difference.

In this embodiment, sealing between the internal volume and the second external zone is broken by expelling the sealing material from the bore when the first pressure difference is reached between the internal volume and the second external zone. By ensuring that sealing is broken by means of a plug that is distinct from the housing, it is possible to restrict the fuse function to a part that can be exchanged without any need to replace the housing. It is easier to ensure that the fuse function does indeed take place at a given pressure difference when a plug is used rather than an entire housing. It should be observed that the value of the first pressure difference is selected as a function of the type of plug installed in the housing.

In an embodiment additional to the above-described embodiment, provision may be made for the sealing material to be arranged in the bore in such a manner that its presence in the bore can be observed by visual inspection from outside the sensor.

In this embodiment, it is easy to detect that the second sealing means have broken so as to be aware of the state of the first sealing means.

It is then possible to take action in order to repair and/or replace the first sealing means and to replace the plug with a new sealing plug that has sealing material in its bore.

The invention also provides a system including a sensor in accordance with any of the embodiments of the sensor of the invention.

The system of the invention further comprises a hydraulic actuator/jack having a piston and a hydraulic chamber in which the piston slides, said first external zone external to the housing and a portion of the transfer means being situated inside the hydraulic chamber of the actuator so that a movement of the piston in the hydraulic chamber can cause the transfer means to move and entrain movement of the movable part in the internal volume of the housing of the sensor.

In the event of a failure of the first sealing means placed between the internal volume of the housing and the first external zone, which lies in the hydraulic chamber of the actuator, the hydraulic fluid under pressure can penetrate into the internal volume of the housing.

By means of the sensor of the invention, the internal volume of the housing is protected against any risk of excess pressure in this internal volume of the housing. Thus, if the pressure inside the housing increases excessively relative to the pressure that exists in the second zone external to the housing, then the first predetermined pressure difference is reached and at least some of the second sealing means break. Hydraulic fluid can then flow out from the internal volume of the housing via its second opening, thereby enabling the pressure in the internal volume of the housing to be limited and thus limiting any risk of damaging the detector means and/or the housing.

The detection function performed by the sensor remains available even in the event of at least some of the first sealing means breaking. Likewise, the actuator can continue to function even after a hydraulic leak has appeared via the first sealing means.

It is because of these reasons that the sensor of the invention is particularly suitable for measuring the position of a hydraulic actuator piston.

BRIEF DESCRIPTION OF THE DRAWINGS

Other characteristics and advantages of the invention appear clearly from the following description thereof made by way of non-limiting indication and with reference to the accompanying drawings, in which.

DETAILED DESCRIPTION OF THE INVENTION

As mentioned above, the invention relates to a sensor 1 for detecting a sliding position on a piston 22 of a hydraulic actuator 21.

Figure 1:
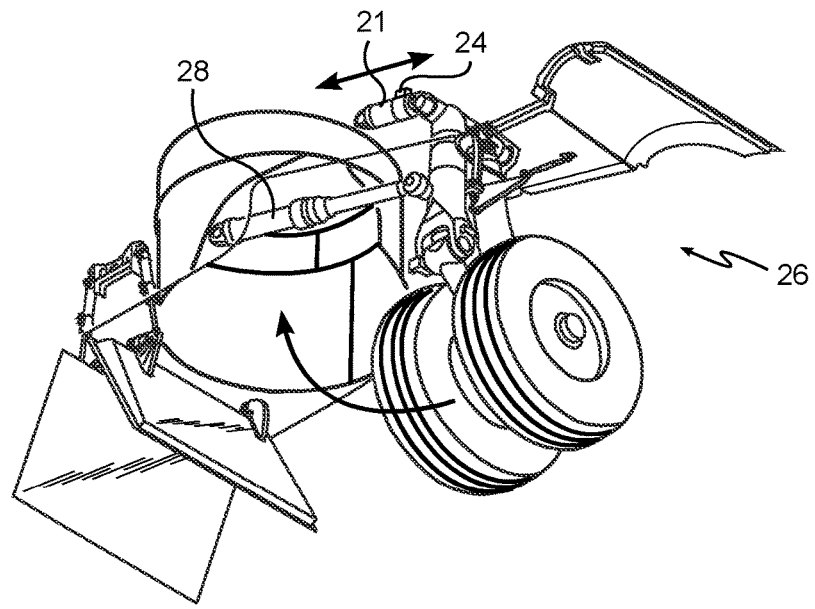
FIG. 1 is a perspective view of aircraft landing gear including a hydraulic actuator/jack for extending and retracting the landing gear, the actuator being fitted with a sensor of the invention.
Figure 2:
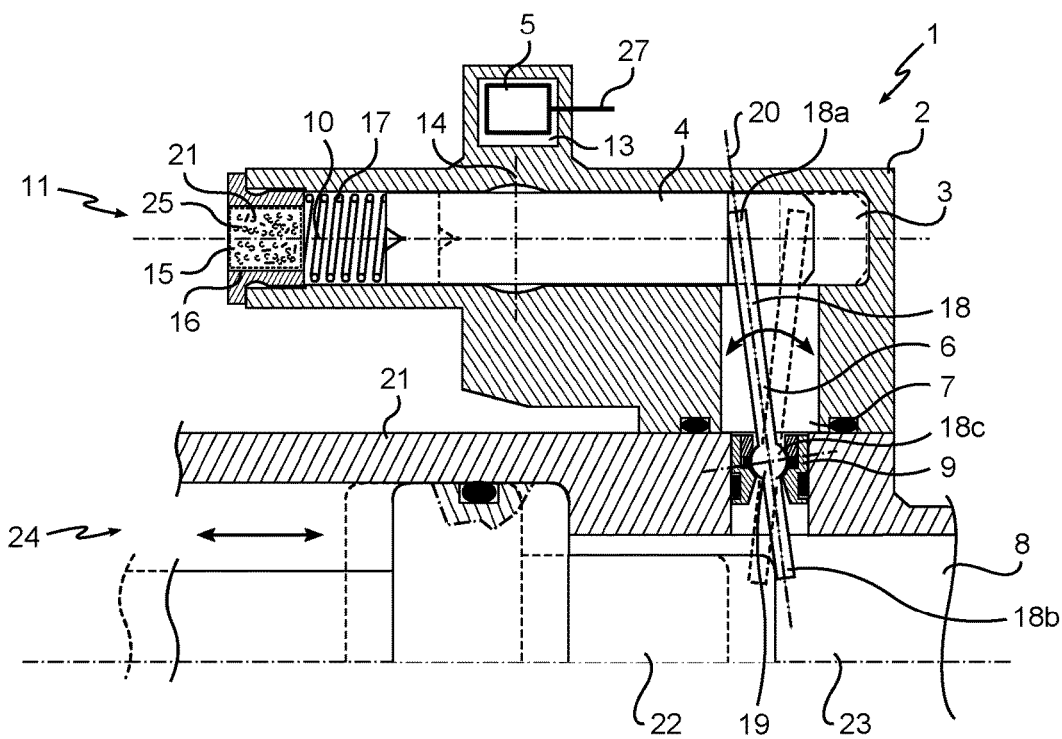
FIG. 2 is a longitudinal section view of a portion of the hydraulic actuator and of the sensor that are shown in FIG. 1, the sensor serving to detect at least one sliding position of a piston inside the actuator.

More particularly, the invention relates to a system such as aircraft landing gear 26 fitted with a hydraulic actuator 21 for extending and/or retracting the aircraft landing gear 26 relative to the airframe of the aircraft. As can be seen in the longitudinal section of FIG. 2, the actuator 21 presents a piston 22 and a hydraulic chamber 23 in which the piston 22 slides.

The sensor 1 is assembled in sealed manner against the cylinder of the actuator 21 so as to detect at least one sliding position of the piston 22 inside the cylinder of the actuator 21.

The sensor 1 of the invention comprises:
  a housing 2 defining an internal volume 3 that is internal to the housing;
  a movable part 4, such as a metal core, situated inside said internal volume 3 of the housing;
  detector means 5 for detecting a movement of said movable part 4 relative to the housing 2;
  transfer means 6 passing through a first opening 7 in the housing 2 and arranged to act from a first external zone 8 external to the housing 2 to cause said movable part 4 to move; and
  first sealing means 9 arranged relative to the housing 2 and to the transfer means 6 to oppose fluid passing from the first external zone 8 external to the housing 2 towards said internal volume 3 of the housing via said first opening 7 of the housing.

The sealed assembly between the sensor and the cylinder of the actuator includes an interface gasket between the housing of the sensor and the cylinder of the actuator, this interface gasket is annular around the first opening 7 of the housing 2.

The assembly between the sensor and the actuator is made:
  in such a manner that the first outer zone 8 of the housing 2 and a portion of the transfer means 6 are situated inside the hydraulic chamber 23 of the actuator 21; and
  in such a manner that a movement of the piston 22 in the hydraulic chamber can cause the transfer means 6 to move and entrain movement of the movable part 4 in the internal volume 3.

The transfer means 6 that pass through the first opening in the housing comprise a lever 18 having first and second portions 18a and 18b situated on either side of a spherical portion 18c of the lever.

The first lever portion 18a lies inside the internal volume 3 and presses against the movable part 4. The second portion 18b of the lever 18 extends in the first external zone 8 and is arranged so that the piston 22 can come into contact against said second portion 18b, at least when the piston 22 reaches an end-of-stroke position inside the actuator.

The sensor 1 has packing surrounding the spherical portion 18c of the lever so as to enable it to pivot relative to the packing about at least one pivot axis 19 perpendicular to a main axis 20 of the lever 18. It should be observed that the lever is a part extending longitudinally along this main axis 20, the lever preferably being a body of revolution. The packing, which forms part of the first sealing means 9, provides sealing against the spherical portion 18c of the lever 18, all around the spherical portion 18c.

The packing comprises:
  an outer ring pressing against the inside of a complementary bore formed in the cylinder of the actuator or in the housing 2; and
  an inner ring inserted in a bore formed in the outer ring.

The spherical portion 18c is wedged between these rings which have respective inside diameters smaller than the outside diameter of the spherical portion 18c.

An inner O-ring seal rubs against and around the spherical portion 18c while being held axially by being wedged between the inner and outer rings.

An outer O-ring seal seals the periphery of the outer ring relative to the bore that receives it.

The detector means 5 comprise electronic components situated in a protected space 13 of the housing that is spaced apart from the internal volume 3.

In order to avoid any risk of the housing or of the electronic component being degraded in the event of at least partial failure of the first sealing means, the invention proposes that:

the housing 2 includes a second opening 10 extending between said internal volume 3 of the housing 2 and a second external zone 11 of the housing; and that second sealing means 12 arranged between the internal volume 3 and the second external zone 11 to oppose the passage of fluid via said second opening 10, at least some of the second sealing means 12 being adapted to break to allow fluid to pass as soon as the internal pressure in the internal volume 3 exceeds the external pressure in the second external zone 11 by a first pressure difference that is predetermined and not zero.

Typically, the second external zone is spaced apart from the first and is arranged so as to be subjected to ambient pressure that exists outside the sensor and outside the actuator.

The second sealing means are designed such that the first pressure difference has a value lying in the range 150 kPa to 25000 kPa, preferably 150 kPa to 3000 kPa and preferably lying in the range 150 kPa to 500 kPa, this value corresponding to the difference between a pressure existing inside the internal volume and a pressure existing in the second zone external to the housing.

It should be observed that the minimum value of 150 kPa is selected to be greater than the pressure difference existing between atmospheric pressure measured at an altitude of 0 meters (m) and atmospheric pressure measured at an altitude of 12,000 m.

Thus, the second sealing means withstands the variations in ambient pressure to which the aircraft is subjected during its flights.

In contrast, in the event of the first sealing means breaking, if the pressure between the internal volume 3 and the second external zone exceeds the value of the first predetermined pressure difference, then at least some of the second sealing means break mechanically to allow the fluid to pass. Thus, these second sealing means act as a hydraulic fuse.

This permanent breakage serves to leave proof that the first sealing means have failed, thereby facilitating maintenance of the sensor.

To ensure that this programmed break takes place as a function of the first pressure difference, the second sealing means include a plug 15 assembled by means of a screw thread in the second opening 10 of the internal volume 3. The plug 15 has one face facing towards the internal volume 3 and another face facing towards the second external zone 11, together with a bore 16 extending between its two faces.

The bore 16 is filled with a sealing material 25 arranged in such a manner as to be expelled from the bore as soon as a pressure difference exists between the faces that is equal to or greater than said first predetermined pressure difference.

The sealing material is a sealant, preferably a polymer sealant, preferably a room temperature vulcanization silicone.

The sealing material may also be a metal or a thermoplastic polymer cast into the bore 16.

Its resistance to ejection depends on the adhesion between the sealing material 25 and the inside surface of the bore 16, and in particular on the section of the sealing material.

Since the plug is screwed in, it can easily be replaced during a maintenance operation. Sealing between the second opening 10 and the plug may be obtained by means of a peripheral gasket around the plug, for example.

Since the outside face of the plug is visible from outside the sensor, the presence of the sealing material 25 in the bore can be observed visually. The absence of sealing material in the bore makes it possible by simple visual inspection to detect that there has been a malfunction of the first sealing means.

It is also possible for the sealing material to be connected via a flexible connection to the remainder to the plug so as to prevent it being lost when it is ejected from the bore.

A return spring 17 exerts a resilient return force on the movable part 4, urging it towards a first position, which part slides inside the internal volume 3. This first position in this example corresponds to the position occupied by this part 4 when the piston 22 is in a position remote from the end of its stroke. The return spring 17 is compressed between the plug 15 and the movable part 4 against which it bears. The spring enables the lever 18 to return resiliently towards a position in which it is to be found when it is not in contact with the piston 22.

It should be observed that the bore 16 formed through the plug is a right cylinder and presents a diameter suitable for preventing the movable part 4 from passing through, which part is itself in the shape of a right cylinder. This avoids any risk of the part 4 being ejected through the bore 16. The sensor can thus continue to function even if the sealing material 25 has been ejected because the first sealing means have broken.

The sensor 1 also has third sealing means 14 arranged to prevent fluid passing between the internal volume 3 and the protected space 13. Thus, the protected space 13 serves to prevent the electronic component being subjected to the pressure variations inside the internal volume 3. These electronic components are arranged to detect the movement of the movable part 4 relative to the housing and to deliver a signal representative of this movement to an electronic unit remote from the sensor. These electronic components may constitute a magnetic or capacitive sensor for detecting the proximity of the part 4.

The signal may be delivered via wire means 27 connected to the electronic components and passing through the housing in sealed manner. The wire means 27 may optionally include a connector external to the housing so as to facilitate interchanging the sensor.

The second sealing means 12 and the third sealing means 14 are arranged so that in the event of the pressure inside the internal volume 3 increasing, the second sealing means 12 always break before sealing is lost via the third sealing means 14.

The system of the invention is used for detecting the moment when the landing gear is fully extended and when the side-brace 28 of the landing gear needs to be locked in order to prevent the landing gear returning towards a retracted position.

The invention is not limited to the above-described examples and may include other embodiments that have not been described. In particular, although the second sealing means are made with the help of a sealing material 25 placed in a bore 16 in the plug, the invention may also include functionally equivalent means such as a capsule placed in the bore of the plug, the capsule possibly being in the form of a plate that may include a preferred zone of weakness in the capsule (e.g. a score line in the capsule).

The invention claimed is:

1. A sensor (1) comprising:
   a housing (2) defining an internal volume (3) that is internal to the housing;
   a movable part (4) situated inside said internal volume (3) of the housing;
   a detector (5) for detecting a movement of said movable part (4) relative to the housing (2);
   transfer means (6) passing through a first opening (7) in the housing (2) and arranged to act from a first external zone (8) external to the housing (2) to cause said movable part (4) situated inside said internal volume (3) to move; and
   first sealing means (9) arranged relative to the housing (2) and to the transfer means (6) to oppose fluid passing from the first external zone (8) external to the housing (2) towards said internal volume (3) of the housing via said first opening (7) of the housing,
   wherein the housing (2) further includes a second opening (10) extending between said internal volume (3) of the housing (2) and a second external zone (11) external to the housing;
   wherein the second sealing means (12) arranged to oppose fluid passing via said second opening (10) between the internal volume (3) and the second external zone (11), at least some of the second sealing means (12) being adapted to break to allow fluid to pass as soon as an internal pressure in the internal volume (3) exceeds an external pressure in the second external zone (11) by a first predetermined pressure difference, and
   wherein the first predetermined pressure difference is a value lying in a range 150 kPa to 25 000 kPa, said value corresponding to a pressure difference between a pressure existing inside the internal volume and a pressure existing in the second external zone external to the housing.

2. The sensor according to claim 1,
   wherein the detector (5) include electronic components that are situated in a protected space (13) of the housing that is spaced apart from said internal volume (3), the sensor (1) further including third sealing means (14) arranged to oppose fluid passing between the internal volume (3) and the protected space (13), the second sealing means (12) and the third sealing means (14) being arranged so that in the event of the pressure inside the internal volume (3) increasing, the second sealing means (12) always break before the sealing of the first sealing means (1) is broken.

3. The sensor according to claim 1,
   wherein the second sealing means include a plug (15) assembled in the second opening (10) of the internal volume (3), the plug (15) having one face facing towards the internal volume (3) and another face facing towards the second external zone (11), and a bore (16) extending between these two faces of the plug (15), the bore (16) being filled with a sealing material (25) arranged so as to be expelled from the bore (16) when the plug (15) is subjected to a pressure difference between its faces that is equal to said first predetermined pressure difference.

4. The sensor according to claim 3,
   wherein the sealing material (25) is arranged in the bore so that its presence in the bore can be observed visually from outside the sensor (1).

5. The sensor according to claim 3,
   wherein the plug (15) is assembled to the housing (2) by a thread.

6. The sensor according to claim 3,
   wherein the movable part (4) is slidable inside said internal volume (3) of the housing, and a return spring (17) exerts a resilient return force on the movable part (4) urging it towards a first position, the return spring (17) being compressed between the plug (15) and the movable part (4) against which it bears.

7. The sensor according to claim 3,
   wherein the sealing material is a sealant.

8. The sensor according to claim 1,
   wherein the transfer means (6) passing through the first opening of the housing comprises a lever (18) having first and second portions (18a, 18b) situated on either side of a spherical portion (18c) of the lever, the first portion (18a) of the lever being inside the internal volume (3) and bearing against the movable part (4), and the second portion (18b) of the lever extending in the first external zone (8), the sensor (1) further including packing clamped against the spherical portion (18c) of the lever so as to enable it to pivot relative to the packing about at least one pivot axis (19) perpendicular to a main axis (20) of the lever (18), the packing forming part of said first sealing means (9) and providing sealing against the spherical portion (18c) of the lever (18).

9. A system (24) comprising
   the sensor (1) according to claim 1 and
   further comprising a hydraulic actuator (21) having a piston (22) and a hydraulic chamber (23) in which the piston (22) slides, said first external zone (8) external to the housing (2) and a portion of the transfer means (6) being situated inside the hydraulic chamber (23) of the actuator (21) so that a movement of the piston (22) in the hydraulic chamber can cause the transfer means (6) to move and entrain movement of the movable part (4) in the internal volume (3) of the housing (2) of the sensor (1).

10. The system (24) according to claim 9,
    wherein the transfer means (6) passing through the first opening of the housing comprises a lever (18) having first and second portions (18a, 18b) situated on either side of a spherical portion (18c) of the lever, the first portion (18a) of the lever being inside the internal volume (3) and bearing against the movable part (4), and the second portion (18b) of the lever extending in the first external zone (8),
    wherein the sensor (1) further includes packing clamped against the spherical portion (18c) of the lever so as to enable it to pivot relative to the packing about at least one pivot axis (19) perpendicular to a main axis (20) of the lever (18), the packing forming part of said first sealing means (9) and providing sealing against the spherical portion (18c) of the lever (18), and
    wherein the second portion (8b) of the lever (18) extending in the first external zone (8) is arranged to come into contact against the piston (22) of the hydraulic actuator (21) at least when the piston (22) is in an end-of-stroke position.

11. The system according to claim 9, wherein the actuator (21) is a hydraulic actuator for extending and/or retracting aircraft landing gear (26).

\* \* \* \* \*